United States Patent
Kedida et al.

(10) Patent No.: US 11,113,032 B2
(45) Date of Patent: Sep. 7, 2021

(54) FUNCTION ACCESS SYSTEM

(71) Applicant: Palantir Technologies Inc., Palo Alto, CA (US)

(72) Inventors: Samuel Kedida, Jersey City, NJ (US); Andy Chen, New York, NY (US); Mihir Rege, Row (GB); Mikita Samsonau, New York, NY (US); Vipul Shekhawat, Brooklyn, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 16/920,116

(22) Filed: Jul. 2, 2020

(65) Prior Publication Data

US 2021/0048987 A1 Feb. 18, 2021

Related U.S. Application Data

(60) Provisional application No. 62/886,775, filed on Aug. 14, 2019.

(51) Int. Cl.
| | | |
|---|---|---|
| *G06F 3/0484* | (2013.01) | |
| *G06F 9/44* | (2018.01) | |
| *G06F 9/451* | (2018.01) | |
| *G06F 3/0482* | (2013.01) | |
| *G06F 11/36* | (2006.01) | |
| *G06F 8/30* | (2018.01) | |
| *G06F 16/23* | (2019.01) | |
| *G06F 8/65* | (2018.01) | |

(52) U.S. Cl.
CPC .................. *G06F 8/30* (2013.01); *G06F 8/65* (2013.01); *G06F 16/2379* (2019.01)

(58) Field of Classification Search
CPC .. G01F 16/2282; G01F 16/93; G01F 16/2358; G01F 16/2379; G06F 40/205; G06F 3/04842; G06F 8/30; G06F 8/65; G06F 11/3688; G06F 11/0706; G06F 11/0766; G06F 8/38; G06F 9/451
See application file for complete search history.

(56) References Cited

U.S. PATENT DOCUMENTS

| | | | |
|---|---|---|---|
| 10,235,533 B1 | 3/2019 | Thoren et al. | |
| 2019/0130020 A1* | 5/2019 | Helms | G06F 8/35 |

FOREIGN PATENT DOCUMENTS

| | | |
|---|---|---|
| EP | 3467682 | 4/2019 |

OTHER PUBLICATIONS

Xie et al., Poster: Group Preference Based API Recommendation via Heterogeneous Information Network, 2 pages (Year: 2018).*

(Continued)

*Primary Examiner* — Thuy Dao
(74) *Attorney, Agent, or Firm* — Knobbe Martens Olson & Bear LLP

(57) ABSTRACT

Systems and methods for dynamically generating application programming interfaces and managing functions associated with a data object type. In an aspect, the system accesses an object definition for a type of data object. The system generates an application programming interface associated with the type of data object, based at least partly on the object definition. The system determines a change to the object definition for the type of data object and updates the application programming interface based at least partly on the change to the object definition.

15 Claims, 7 Drawing Sheets

(56) References Cited

OTHER PUBLICATIONS

Official Communication for European Patent Application No. 20187271.0 dated Dec. 22, 2020, 9 pages.
Graeme Stevenson et al, "Sapphire: Generating Java Runtime Artefacts from OWL Ontologies." CAiSE 2011 International Workshops, Proceedings in Lecture Notes in Business Information Processing, Jun. 20-24, 2011, pp. 425-436.

* cited by examiner

FUNCTION ACCESS SYSTEM

INCORPORATION BY REFERENCE TO ANY PRIORITY APPLICATIONS

This application claims benefit of U.S. Provisional Patent Application No. 62/886,775, filed Aug. 14, 2019, and titled "FUNCTION ACCESS SYSTEM." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

The present disclosure relates to systems and techniques for dynamically generating application programming interfaces and managing functions associated with a data object type. More specifically, the present disclosure relates to a function access system that may be configured to update an application programming interface to reflect a change in the object definition for a type of data objects and allow a user to apply functions to a set of data regardless of specific formatting or storage methods.

BACKGROUND

Large data stores represent a vast collection of information that may be utilized or relied upon by programs, applications, or even other data stores. Often, valuable data or information is encoded in a specific format in a data store for efficient organization, storage, and retrieval (e.g., information may be organized and stored as tabular entries in a large spreadsheet). Because a data store may contain information that is used by another data store, a receiving data store must identify changes in information in a transmitting data store and update relevant data entries accordingly. However, because a data store may not recognize or identify received data in an incompatible storage format, there is a need to transform data from one storage format to one or more other storage formats and, if required, transmit the transformed data to the appropriate data stores.

SUMMARY

The invention is defined by the independent claims. The dependent claims concern optional features of some embodiments of the invention. The systems, methods, and devices described herein each have several aspects, no single one of which is solely responsible for its desirable attributes. Without limiting the scope of this disclosure, several non-limiting features will now be discussed briefly.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

One aspect of the disclosure provides a system for detecting a change to an object definition and generating an application programming interface in response to detecting the change. The system comprises one or more hardware processors and a computer storage medium configured to at least store computer-executable instructions to be executed by the one or more hardware processors. The one or more hardware processors may be configured to access an objection definition for a type of data object, generate an application programming interface associated with the type of data object, based at least partly on the object definition, determine a change to the object definition for the type of data object, and update the application programming interface based at least partly on the change to the object definition.

DETAILED DESCRIPTION

Overview

Figure 1:
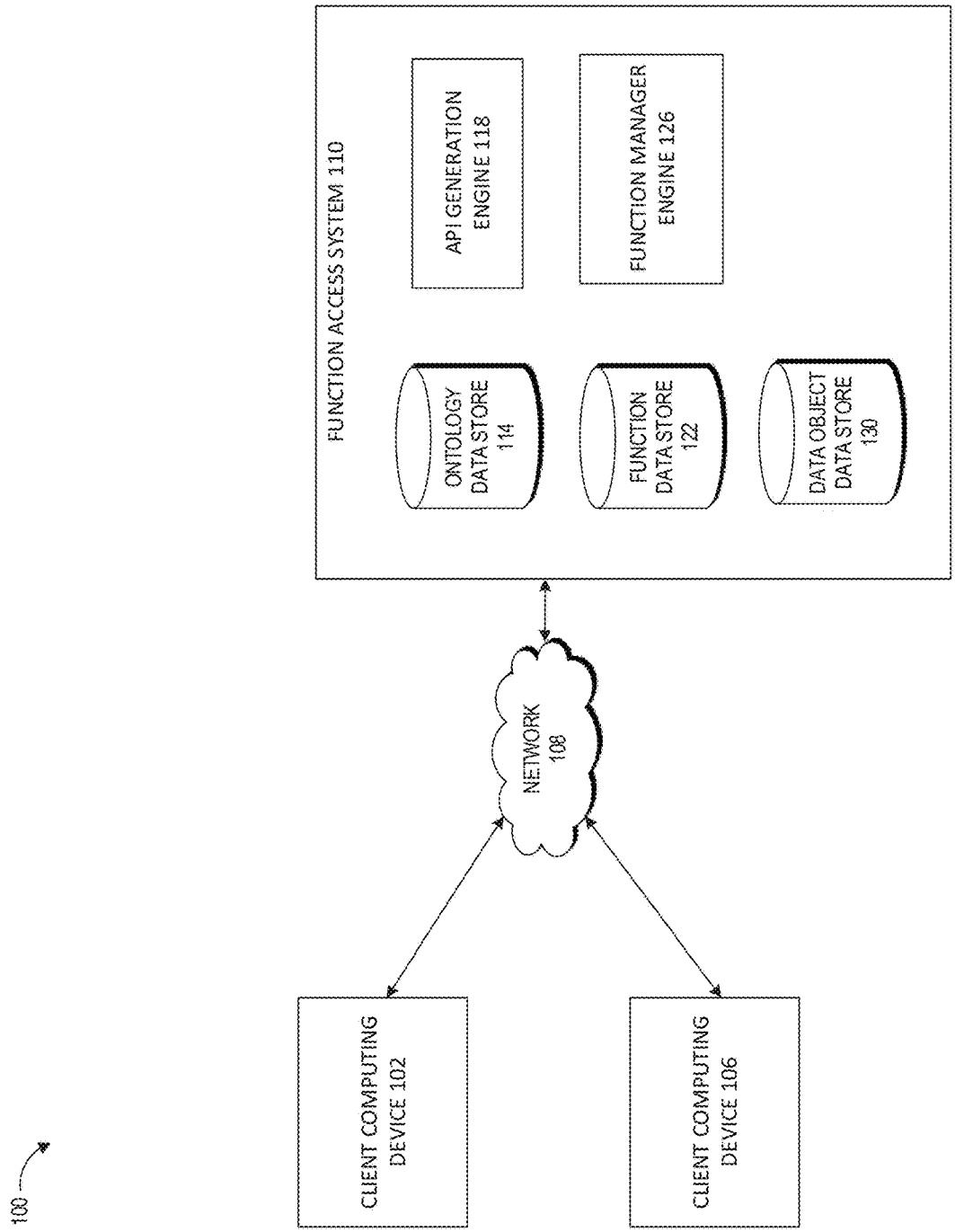
FIG. 1 is an overview of an example function access system.

For purposes of improving reliability and accessibility of large data sets, it is advantageous that a change in an object definition is properly incorporated into an application programming interface (API) or that newly-submitted or written functions associated with a data object type are accessible by other users. However, because not all data sets or data stores use identical formatting, a user may not be able to incorporate changes or execute an action not already-defined in a data analysis system without writing code to specifically implement the action in a particular programming language. Thus, existing systems may lack standardization of data or standardization of access to related data in various formats, and may further lack the ability to easily implement new functions or logic into existing programming environments.

A user-defined ontology may define properties specific to the one or more types of data objects. These defined properties are referred to as object definitions. The function access system accesses an object definition for one or more types of data objects and detects one or more changes to the object definition. For example, the system may detect a change involving adding, removing, renaming, or otherwise modifying a property associated with a type of data object. The change to the object definition may be made by a user directly, by a user indirectly (e.g., user changes to data objects may indirectly cause updates to the associated object type definition in the ontology), by the computer automatically (e.g., as a result of the system synchronizing data object type definitions between systems, or to harmonize an ontology), any combination of the foregoing, and/or the like.

The function access system may generate one or more APIs based at least partly on the object definitions that may be part of a user-defined ontology. The system may, for example, generate APIs that are specific to each type of data object. The APIs may allow a user to execute commands or reference properties associated with data objects of the types defined by the user-defined ontology. As will be described in more detail below, the APIs may also allow access to information associated with a type of data object based on a user's permission level.

The function access system may further include one or more interactive graphical user interfaces ("UIs") by which a user may, for example, edit the object definitions in a user-defined ontology or create new types of data objects, access or execute the APIs, define or execute functions associated with types of data objects (e.g., making use of the APIs), access and execute functions stored in the registry of functions (also referred to herein as the "function data store"), among other functionality. For example, the function access system may receive a selection of a command via a UI. The selection may be a click by a user on a suggested function or command from an automatically-generated list of suggestions or from a drop-down menu of available methods, functions, or commands associated with a type of data object. The system may then execute the selected command against a particular data object or set of data objects, and provide the results of the execution of the selected command.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Entity: An individual, a group of individuals (e.g., a household of individuals, a married couple, etc.), a business, or other organization.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties (or "Attributes"): information about a data object, such as an entity, that represent the particular data object. Each attribute of a data object has a property type and a value or values. Entity properties, for example, may include name, address, postal code, IP address, username, phone number, etc.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Ontology: Stored information that provides a data model for storage of data in one or more databases. For example, the stored data may comprise definitions for data object types and respective associated property types. An ontology may also include respective link types/definitions associated with data object types, which may include indications of how data object types may be related to one another. An ontology may also include respective actions associated with data object types. The actions associated with data object types may include, e.g., defined changes to values of properties based on various inputs. An ontology may also include respective functions, or indications of associated functions, associated with data object types, which functions, e.g., may be executed when a data object of the associated type is accessed. An ontology may constitute a way to represent things in the world. An ontology may be used by an organization to model a view on what objects exist in the world, what their properties are, and how they are related to each other. An ontology may be user-defined, computer-defined, or some combination of the two. An ontology may include hierarchical relationships among data object types. The technical aspects of an ontology are referred to as object definitions specifying, e.g. data formats, storage format, and storage locations of associated types of data objects.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Examples of Function Access Systems and Methods

FIG. 1 is an overview of an example function access system in an example computing/network environment. The example computing/network environment 100 may comprise one or more client computing devices, e.g., a first client computing device 102 and a second client computing device 106, and a function access system 110. In some embodiments, the first client computing device 102, second client computing device 106, and function access system 110 may be in communication with one another over network 108. In some embodiments, network 108 may comprise the Internet, a local area network, a wide area network, a wireless network, and/or any combination of the foregoing.

Client computing device 102 may be a computer, handheld mobile computing device, or other computing system. A user of client computing device 102 may initiate a change to an object definition in a user-defined ontology associated with a type of data object. A number of computing systems may each be used by a number of different users to submit newly-written functions associated with a type of data object. A function may be associated with multiple types of data objects. Changes to an object definition or new functions associated with a data object type submitted from client computing device 102 may be transmitted remotely to the function access system 110 over network 108. It will be appreciated that, in some embodiments, multiple users may utilize one or more client computing devices 102 to change a user-defined ontology or submit functions associated with a particular data object type. Client computing device 106 may be a computer, handheld mobile computing device, or other computing system that another user may utilize to access information on the function access system 110 or request execution of a function associated with one or more data object types through function access system 110.

Function access system 110 may be configured to generate one or more APIs and allow access to user-submitted functions, and may comprise a number of component engines and data stores. In the example system of FIG. 1, function access system 110 comprises an ontology data store 114, API generation engine 118, function manager engine 126, and function data store 122, and data object data store 130.

The ontology data store 114 may be a database storing object definitions of user-defined ontologies for one or more data object types. In some embodiments, the user-defined ontology may define properties specific to the one or more types of data objects. For example, a type of data object representing a business entity may comprise properties such name, address, public or private status, number of offices, etc. The type of data object representing a business entity may also be associated with specific functions that allow searching, filtering, sorting, or other actions to be performed on the type of data object. While the term "user-defined ontology" is used in the present disclosure, in some implementations the ontology/ontologies may, in part or in whole, be automatically generated and/or defined.

The API generation engine 118 may generate one or more APIs associated with the object definitions of user-defined ontologies stored in ontology data store 114. For example, in an implementation the API generation engine 118 generates, for each of the one or more types of data objects, respective APIs for those one or more types of data objects. Such APIs may enable at least read and write functionality specific to each of the various types of data objects. In some embodiments, the API generated by API generation engine 118 may determine a set of definitions, operations, functions, and communication methods that a user may utilize in association with a data object type. For example, the API generation engine 118 may allow filtering of a list of business entity data objects according to a "number of offices" property associated with a business entity data object type. In another example, given a different data object type (e.g., a data object type representing a patient admitted to a hospital), the API generation engine 118 may not allow filtering based on a "number of offices" property because the particular patient data object type does not comprise such a property but may instead allow searching or filtering based on a "first date of diagnosis" property specifically associated with a patient data object type. The API generated by API generation engine 118 may be compatible with a variety of programming languages.

In some embodiments, the APIs may enable access to information based on a user's permission level, which permissions may be managed by the function access system. For example, a user may not be allowed to see a particular property associated with the type of data through the APIs if the user's permission level is not high enough. By way of example, a doctor working at a hospital may be associated with an administrator permission level and may access one or more properties associated with a patient data object (e.g., a diagnosis property, a treatment property, etc.). On the other hand, users that are not affiliated with the hospital may be unable to view specific patient data object properties (e.g., diagnosis property) because such users may not be granted an administrator permission level. An API itself may be accessed based on a user permission level or status. For example, a doctor may be associated with a permission level granting access to a Patient object API. However, the doctor may not have permission to view a different API (e.g., a Salary object API).

In some embodiments, API generation engine 118 may monitor ontology data store 114 for changes to an object definition of the user-defined ontology stored in ontology data store 114. The API generation engine may monitor ontology data store 114 by periodically transmitting a polling request to ontology data store 114. The API generation engine 118 may then receive a response transmission from ontology data store 114 comprising all data entries in a data set or in multiple data sets. The API generation engine 118 may receive a response transmission from ontology data store 114 comprising data entries that have been modified since the last time a previous polling request was transmitted. The API generation engine may automatically receive event notifications from the ontology data store when a change to an object definition is made.

The functions data store 122 may be a database storing functions associated with one or more data object types. In some embodiments, each entry in function data store 122 may comprise a set of functions associated with a data object type. Functions associated with a data object type may define a set of operations that may be executed in connection with the data object type. For example, in a data object type representing information regarding social events, the function data store 122 may store functions that allow a user to list social events chronologically by date, sort by location, filter social events by theme, etc. The function data store may store additional metadata associated with each function, such as a metadata associated with a Display Name or Description field. The function data store may comprise functions written in different programming languages (e.g., C, Java, Python, Ruby, JavaScript, etc.). The function data store may store different versions of the same function. The function data store may store references to other systems. For example, an entry in function data store 122 may comprise a reference to a remote server containing an old version of a function stored in function data store 122. Specific data object types may be associated with particular functions. The functions may therefore utilize APIs specific to certain data object types. For example, in contrast to the social event data object type mentioned above, a data object type representing a business entity may not be associated with a function to filter business entities by theme but may instead be associated with a function to compute the business entity's net profits over a period of time. An API associated with the business entity data object type may therefore enable access to an "organization structure" property or variable, which may be utilized by a function associated with the business entity data object type. For example, a filtering function associated with a business entity data object type may filter business entity instances according to an organization structure. In contrast, another API may not grant access to an "organization structure" property (e.g., an API associated with a social event data object type), and a filtering function associated with the data object type may therefore be unable to filter according to the "organization structure" property. A user of client computing device 102 may write and submit code to implement new functions associated with one or more data object types. For example, a user may submit code to allow other users to analyze a data set and display results that were previously not defined. The function data store may support a variety of input types, such strings, integers, object types, etc. The function data store may also support new input types defined and added by a user.

Function manager engine 126 may allow a user of client computing device 106 to access information associated with a data object type or execute a function stored in function data store 122. For example, in one embodiment, function manager engine 126 may generate a user interface displaying a data set to one or more users. For example, function manager engine 126 may receive a request to view a list of all data objects of a certain type (e.g., products on an online catalog) and display the list to a user. In some embodiments, the function manager engine 126 may also enable options to analyze a data set. For example, function manager engine 126 may generate a user interface comprising a data set and a search bar allowing a user of computing device 106 to search for one or more functions stored in function data store 122 associated with the data set. A user may provide user input in the form of alphanumeric text or keywords to search for functions responsive to the user input. For example, if a user types "filter" in a user interface, the function manager engine 126 may display a list of functions that may have "filter" in the name or description of the function. The functions displayed may be specific to the types of data objects displayed in the user interface.

Function manager engine 126 may receive a user selection of a function and may execute the function accordingly. For example, the function manager engine 126 may initially display a list of data objects of the "patients" type, receive a user input for "filter," display a list of filtering options to the user, receive a selection to filter by an "age" property, and display the filtered list to the user. The function manager engine 126 may communicate with the data object data store 130 to load objects based on an execution request submitted by the user.

In some embodiments, the function manager engine 126 may be in communication with function data store 122 and may enable access to certain functions associated with a data object type. The function manager engine 126 may enable access to certain functions according to a user's permission level. For example, the function access system 110 may enable a user to perform a filtering function on a list of patient data objects if the user is associated with an administrator permission level, but may not allow access to the filtering function for users with a lower permission level.

Data object data store 130 may store one or more instances of various data object types. In some embodiments, the instances of data object types may be defined based at least partly on an object definition stored in ontology data store 114. For example, assuming ontology data store 114 includes a type of data object representing a business entity associated with properties such name, address, public or private status, number of offices, etc., data object data store 130 may be a database wherein an entry in the database comprises a particular instance of the business entity data object type. It will be appreciated that the data object instances may utilize a variety of storage formats or storage locations. For example, one data object instance may be stored as a text file comprising alphanumeric text defining property values associated with the data object type, while another data object instance may also be stored as an entry in a large tabular spreadsheet. It will be appreciated that a data object instance may be stored in a database located in a first location while another data object instance may be stored in a database located in a second location. At least one of the storage format and the storage location may be specified in an object definition associated with the respective type of data object.

Although the above discussion assumes that one user requests access to one or more data sets or requests execution of one or more functions via client computing device 106, other examples may utilize different implementations. For example, an example function access system may receive execution requests from multiple client computing devices 106 or receive changes to a user-defined ontology from multiple client computing devices 102.

Figure 2:
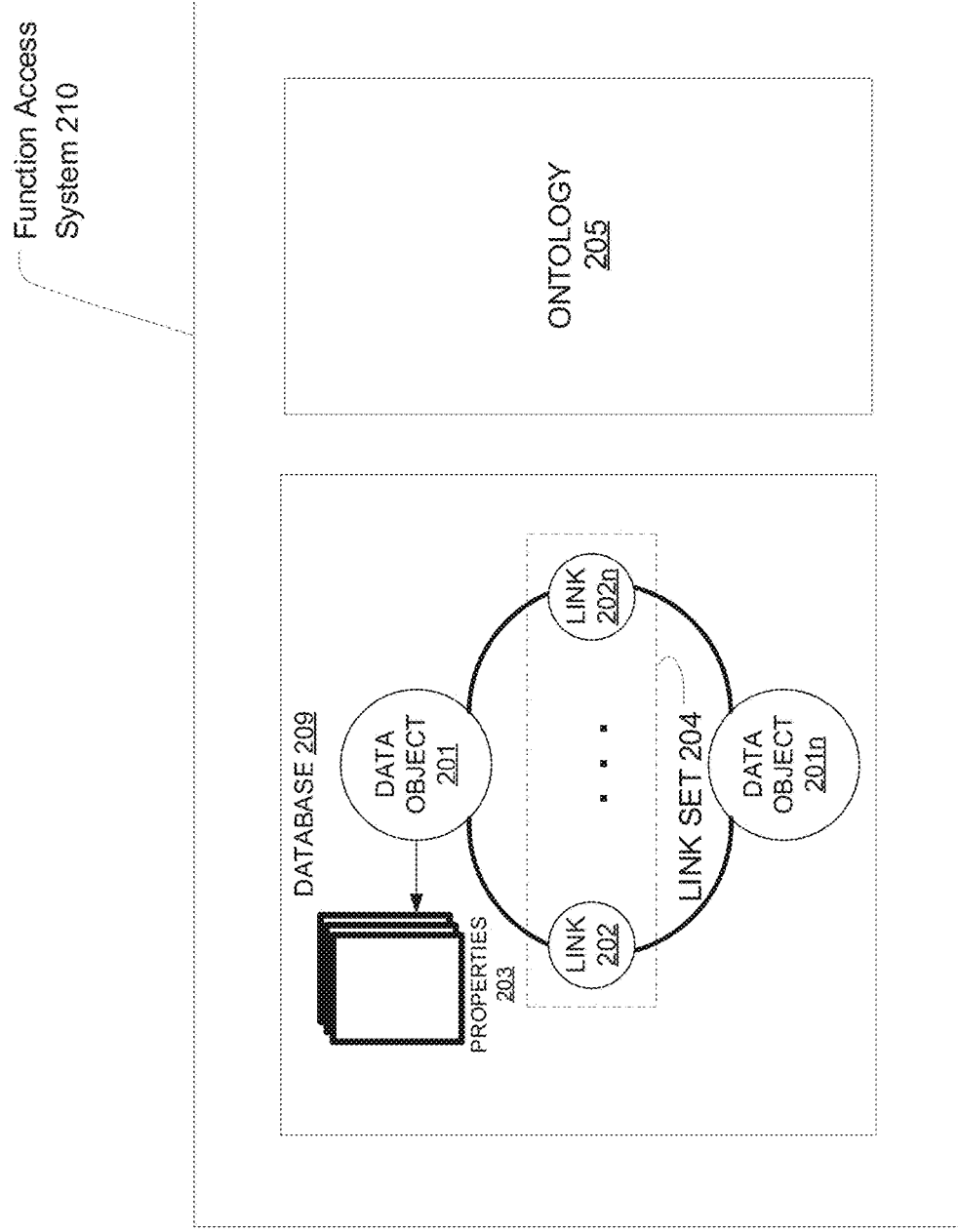
FIG. 2 illustrates one embodiment of a database system using an ontology including object definitions for a type of data objects.

FIG. 2 illustrates an object-centric conceptual data model according to an embodiment. As noted above, an ontology may include object definitions providing a data model for storage of data and data objects. The example of FIG. 2 shows an example ontology 205, which e.g. may be stored in ontology data store 114. The example of FIG. 2 further shows example data stored in a database 209, which, in an implementation, corresponds to, or is the same as, data object data store 130. The ontology 205 may be defined by one or more object types, which may each be associated with one or more property types. At the highest level of abstraction, data object 201 is a container for information representing things in the world. For example, data objects 201-201n can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the function access system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202-202n represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
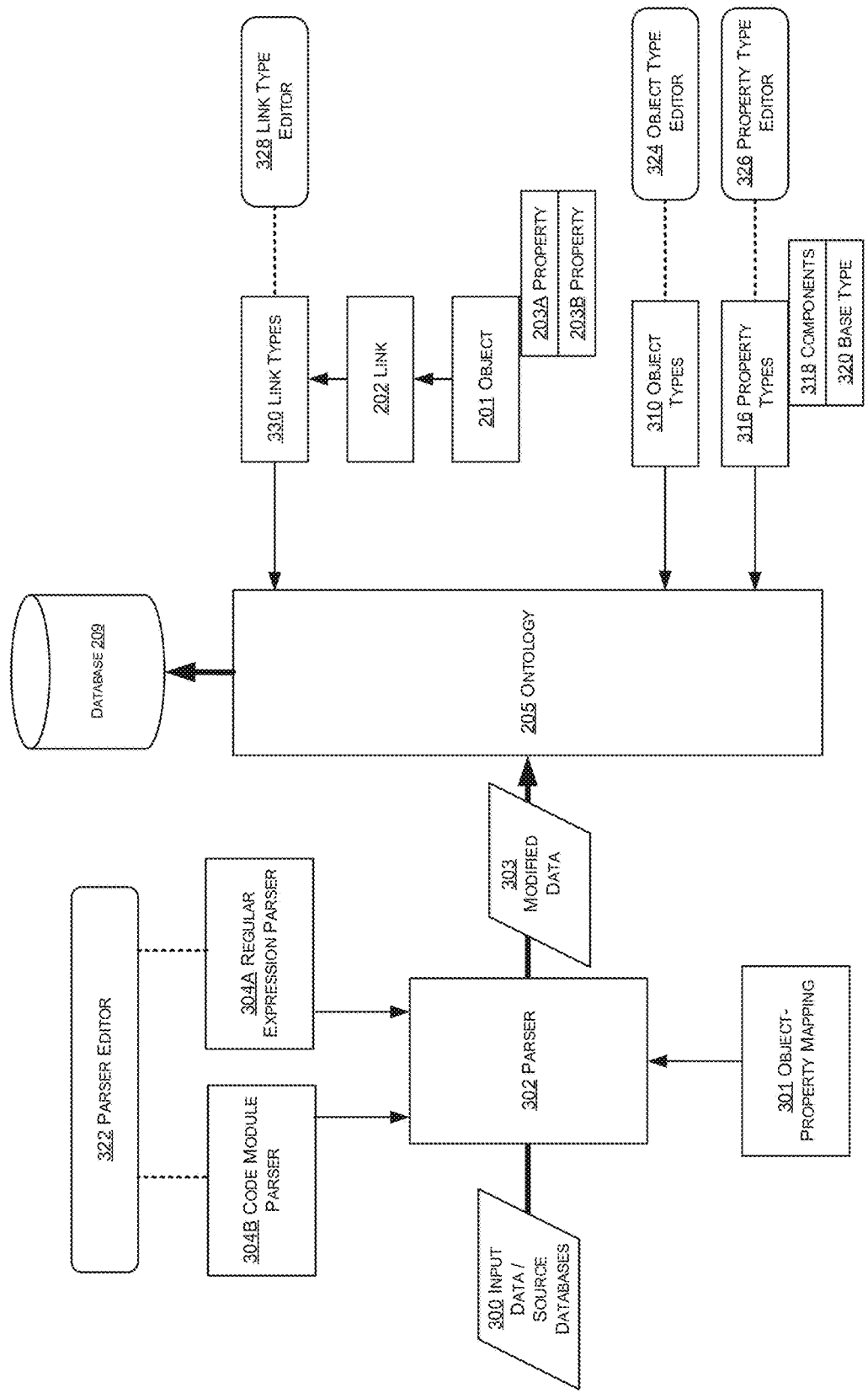
FIG. 3 illustrates one embodiment of a system for creating data in a data store using a dynamic ontology including object definitions for a type of data objects.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to the object definitions in ontology 205 by storing values of the new or modified data in a property of the specified property type. As a result, input data 300 having varying format or syntax according to the object definition can be created in database 209. The object definitions of ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
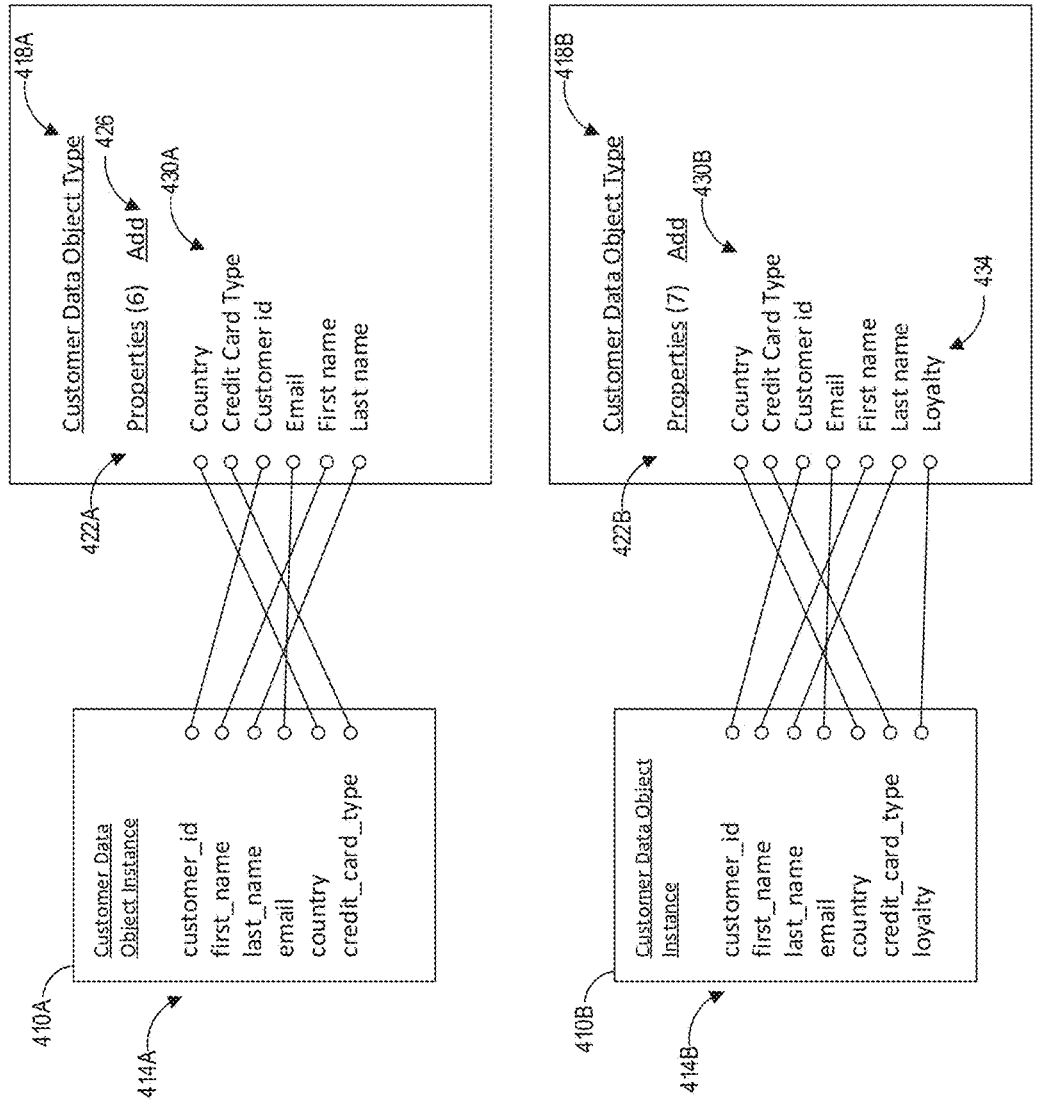
FIG. 4 is a visual representation displaying example data object types and instances of the example data object types.

FIG. 4 is a visual representation displaying example data object types and instances of the example data object types. Visual representation 400 comprises a customer data object type 418A, a customer data object instance 410A, a customer data object type 418B, and a customer data object instance 410B. The data object types are defined by the ontology and may be stored in the ontology data store 114. The data object instances may be defined by the corresponding data object types. Data object instances may be implemented in a variety of formats and locations and may be stored in one or more databases, such as data object data store 130. A user may view data object types and data object instances through a user interface. In some embodiments, customer data object type 418A may represent a "Customer" data object storing information regarding customers of an online retail store. Customer data object type 418A comprises a properties tab 422A which may comprise a list of properties 430A associated with the customer data object type. In the example shown in FIG. 4, customer data object type 418A is associated with six properties called "Country," "Credit Card Type," "Customer id," "Email," "First name," and "Last name." Customer data object type 418A may comprise an "Add" function 426 that a user may select to add an additional property for customer data object type 418A. Customer data object type 418 may be associated with one or more dynamic functions that may take different values whenever a user views an instance of the data object type. For example, a customer data object type may be associated with a List function that will list vendors associated with an instance of the customer data object type. Therefore, the List function associated with a first instance of a customer data object type may list the particular vendors, shops, or stores that a first customer has purchased from and may dynamically update the list to include an up-to-date list of vendors associated with the first customer. Customer data object instance 410A may represent a specific customer among a plurality of other customers represented by other customer data object instances. Customer data object instance 410 may comprise links data files or links to data files containing information associated with property list 414A. The information associated with each property in list 414A may be contained in one data file (e.g., a word document stored in a local database). It will be appreciated that data object instances may be associated with a variety of formats, locations, and programming languages. For example, a customer data object instance may be a text file comprising alphanumeric text located in a first database and/or from or on a server hosted in a first location, while another customer data object instance may be a tabular entry stored in a second, different database (e.g., a data object data store 130) and/or from or located on a server hosted in a second location. Because the system generates APIs specific to data object types and enables mapping across different formats and locations based on detected changes to the object definitions, the function access system may advantageously access the different data object instances regardless of differences in formatting, location, or programming languages. It will be appreciated that a plurality of customer data object instances may contain information mapped across a plurality of locations, files, and formats.

In some embodiments, customer data object instance 410B may represent a customer data object type 418B after a user has added an additional property, "Loyalty," to the customer data object type. In some embodiments, customer data object type 418B comprises a properties tab 422B, which displays a list 430B of seven properties associated with the customer data object type. In the example shown in representation 400, a user has modified the user-defined ontology associated with the customer data object type by adding a "Loyalty" property 434. In some embodiments, the "Loyalty" property 434 may be mapped to a specific file for each instance of the customer data object type 418B. For example, property list 414B may be a text file containing information associated with the properties defined in list 430B, including a "Loyalty" property 434. In some embodiments, customer data object instance 410B may represent a specific instance of customer data object type 418B. In some embodiments, customer data object instance 410B may map a text file named "loyalty" to the Loyalty property field 434, wherein the text file may comprise alphanumeric text representing a number of purchases made by the particular customer represented in customer data object instance 410B, a number of years the customer has been a member of an online retail service, a calculated loyalty score, or some other metric.

Figure 5:
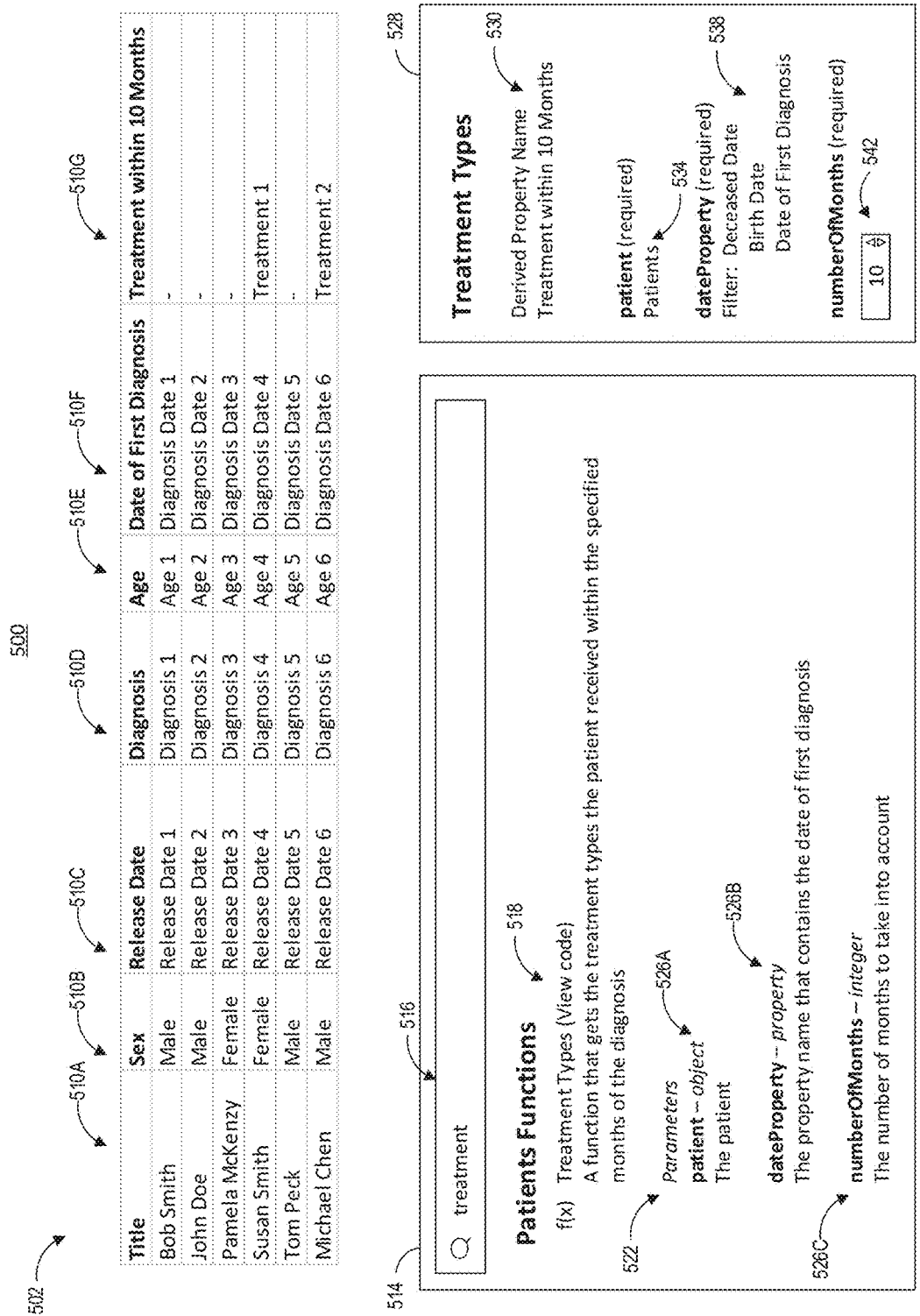
FIG. 5 is an example user interface implementing the function access methods described herein, according to some embodiments.

FIG. 5 is an example user interface implementing the function access methods described herein. User interface 500 may comprise table 502, window 514, and window 528. In some embodiments, table 502 may display a data set comprising a plurality of data object instances. For example, table 502 may display an instance of a "Patient" data object type in each row of the table, wherein each column in the table may represent a property associated with the data object type. In some embodiments, properties 510A, 510B, 510C, 510D, 510E, and 510F may represent "Title," "Sex," "Release Date," "Diagnosis," "Age," and "Date of First Diagnosis" properties associated with the "Patient" data object type.

In some embodiments, window 514 may display information regarding functions that a user may execute to help analyze the data presented in table 502. The functions displayed in window 514 may be specific to a data object type. For example, given a "Patients" data object type, window 514 may display one or more functions specific to the "Patients" data object type (e.g., a "Treatment Types" function). Window 514 may comprise a search bar 516 which allows a user to provide user input to search for specific functions associated with a data object type in a registry of functions or in function data store 122. In some embodiments, a user may provide a user input such as a keyword comprising alphanumeric text in order to search for a function that contains the keyword in a description or title of the function. The function access system may automatically complete the user input as the user is providing the input, or the system may automatically suggest a function or parameters associated with the function based at least partly on the user input. By way of example, a user may input "treatment" as a keyword in search bar 516, and the function access system 110 may automatically display a Treatment Types function 518 in window 514. The function access system may also display a list of functions associated with the data object type based at least partly on the user input. Window 514 may also display information associated with function 518. For example, window 514 may display required parameters for the function 518 under a "Parameters" heading 522. A patient parameter 526A, dateProperty parameter 526B, and numberOfMonths parameter 526C may all be displayed as required parameters to execute the Treatment Types function associated with the "Patients" data object type. A function may also take in two or more objects as an input, and the objects may belong to the same or different data object types. In some embodiments, the window 514 may display descriptive text to help a user understand the purpose of a function as well as its parameters. For example, the function 518 is accompanied by a short description "A function that gets the treatment types the patient received within the specified months of the diagnosis." In some embodiments, one or more users (e.g., a user of computing device 102) may write code and submit functions that may be stored in function data store 122 and may be later accessed by another user (e.g., a user of computing device 106) and displayed in window 514.

In some embodiments, a user may select the displayed function 518 and then be prompted to provide additional information in window 528. Window 528 may comprise a plurality of fields that the user may populate in order to execute function 518. For example, window 528 may require a user to determine a "Derived Property Name" value to be associated with the execution of the function and may also require the user to provide information regarding the parameters associated with function 518. The user may provide user input (e.g., by typing on a keyboard) to define a property name 530. The user may also provide information regarding the parameters associated with function 518. For example, the user may select an individual patient from a dropdown menu in window 528 or select the entire "Patients" list 534 for parameter 526A, select a date option 538 for parameter 526B, and may input a number 542 for parameter 526C. Once a user provides such information in window 528, the function access system may execute the function to list the treatment types that each patient has undergone within 10 months from the date of first diagnosis under column 510G. Advantageously, the function access system 110 allows a user to search for and properly execute functions written by other users without requiring the user to have special technical knowledge or expend time and effort writing new code. It will be appreciated that other data sets and functions may be displayed in other embodiments.

Figure 6:
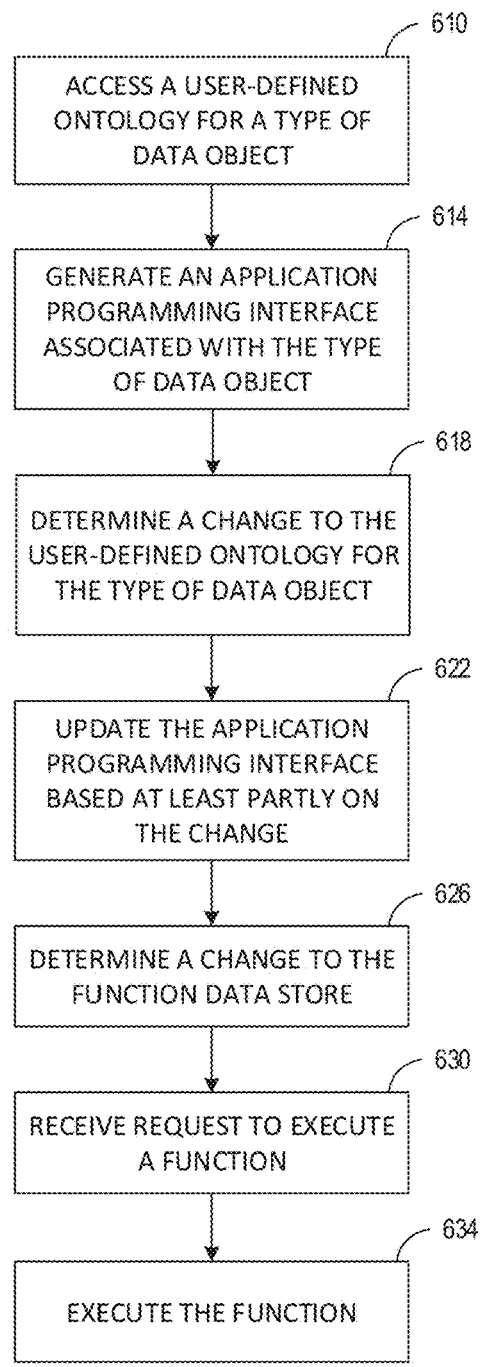
FIG. 6 is a flow diagram depicting an example function access method described herein, according to some embodiments.

FIG. 6 is a flow diagram depicting an example function access method described herein. In block 610, the function access system may access a user-defined ontology for a type of data object. As mentioned above, in some embodiments, the user-defined ontology may define properties specific to the one or more types of data objects. For example, a type of data object representing a business entity may comprise properties such name, address, public or private status, number of offices, or other properties.

In block 614, the function access system may generate an application programming interface associated with the type of data object. In some embodiments, the function access system may generate the API using API generation engine 118. In some embodiments, the function access system generates APIs that are specific to each type of data object. The APIs may allow a user to execute commands or reference properties associated with data objects of the types defined by the user-defined ontology. In some embodiments, the APIs may enable access to information based on a user's permission level, which permissions may be managed by the function access system. For example, a user may not be allowed to see a particular property associated with the type of data through the APIs if the user's permission level is not high enough. In some embodiments, the user permission level may be a numeric value on a number scale. For example, permission levels may range from 0, the lowest permission level, to 5, the highest permission level. The user permission level may be adjustable. In some embodiments, an administrator user may change or modify a user's permission levels manually, or a user's permission level may automatically be modified upon the occurrence of a certain event. For example, an employee's permission level may automatically be demoted to 0 from a higher permission level if the user leaves a company and should no longer be able to access potentially sensitive information handled by function access system 110. A user may also be associated with a permission type. For example, a doctor may be associated with a view and edit permission type with respect to a Patients data object type while an employee of the hospital may be associated with only a view permission type.

In block 618, the function access system may determine a change to the object definition in the user-defined ontology for the type of data object. In some embodiments, the change to the object definition in the user-defined ontology can be adding, removing, renaming, or otherwise modifying a property associated with a type of data object (e.g., add an "organization structure" property to a business entity-type object). The change can also involve adding a new type of data object or removing an existing data object type. In block 622, the function access system may update the corresponding application programming interface based at least partly on the detected change.

In block 626, the function access system may determine a change to the function data store. In some embodiments, the change to the function data store may involve adding a new function associated with a data object type, renaming one or more functions, adding or removing parameters for a function, or some other modification. For example, the function access system may receive a submission of newly-written code for a new function associated with one or more data object types from a computing device 102 over a network 108. The change can also involve adding, removing, renaming, or otherwise modifying a function or command associated with a type of data object (e.g., a code author implements a new search function for a particular type of data object). When a new function is added, other users may then search for and access the new function through the function data store 122, as described above in FIG. 5. In some embodiments, one or more functions may be updated in the function data store based at least partly on a change to the user-defined ontology. For example, if a "Treatment Types" function is associated with a "Patients" data object type, and the function requires a "numberOfMonths" parameter to define the number of months from the date of first diagnosis that should be taken into account when executing the function, the function access system may update the "Treatment Types" function may update to remove the "numberOfMonths" parameter if the user-defined ontology associated with the "Patients" data object type is modified to remove the property defining the date of first diagnosis.

In block 630, the function access system may receive a request to execute a function. For example, while a user is examining a table of "Patients" data object instances, the user may select a "Treatment Types" function to filter the data set. In block 634, the function access system 110 may execute the function. In some embodiments, the execution request may be received and processed by a number of engines or modules. For example, an execution request may first be received by a function manager service. The function manager service may then transmit the request to a function manager engine. The function manager engine may generate one or more isolated instances of a processing engine. Each instance of the processing engine may be separate from other instances, thereby allowing the function access system to securely execute functions in a controlled and isolated computing environment. An instance of the processing engine may execute one or more functions. The isolated instance of the processing engine may execute a function by accessing a data set and a function stored in a function data store, function registry, or service. The function manager service may impose limits on the execution such as time limits or memory usage for each function execution. The result or output of the executed function may then be sent back to the function manager service engine. The function manager service engine may then transmit the result to the user via a user interface. It will be appreciated that the execution of the function may depend on a user permission level. For example, a function may only be executed if the user requesting the execution of the function is associated with an "administrator" user permission level. Assuming the user has a valid user permission level, the function access system may then execute the function and display the output or result to the user through a user interface.

Although the blocks in FIG. 6 are displayed in sequential order, it will be appreciated that the blocks may be ordered differently in other embodiments. For example, in some embodiments, blocks 626 and 630 may be executed before blocks 618 and 622. In some embodiments, the steps of determining a change to the object definition in the user-defined ontology and determining a change to the function data store may occur simultaneously. It will also be appreciated that additional or fewer steps may be included in other embodiments.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, declarative programming languages, such as SQL, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
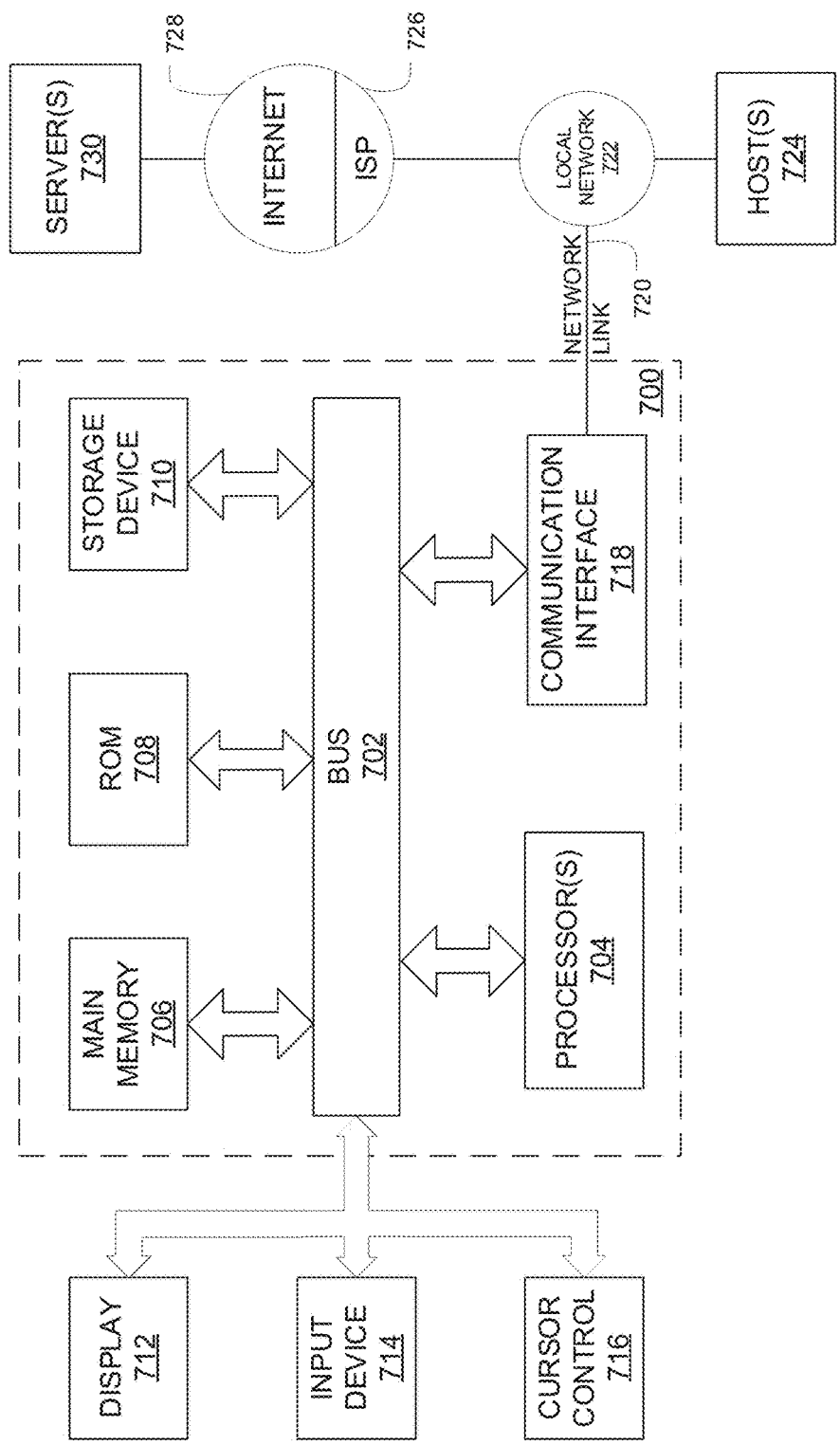
FIG. 7 is a block diagram of an example computing system configured to perform data propagation and mapping.

For example, FIG. 7 is a block diagram that illustrates a computer system 700 upon which various embodiments may be implemented. Computer system 700 includes a bus 702 or other communication mechanism for communicating information, and a hardware processor, or multiple processors, 704 coupled with bus 702 for processing information such as data entries from one or more data stores. Hardware processor(s) 704 may be, for example, one or more general purpose microprocessors configured to execute data propagation and mapping instructions.

Computer system 700 also includes a main memory 706, such as a random access memory (RAM), cache and/or other dynamic storage devices, coupled to bus 702 for storing data entries and instructions to be executed by processor 704. Main memory 706 also may be used for storing temporary variables or other intermediate information during execution of data propagation and mapping instructions to be executed by processor 704. Such instructions, when stored in storage media accessible to processor 704, render computer system 700 into a special-purpose machine that is customized to perform the operations specified in the data mapping and propagation instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and data propagation and mapping instructions.

Computer system 700 may be coupled via bus 702 to a display 712, such as a cathode ray tube (CRT) or LCD display (or touch screen), for displaying graphical user interfaces or data entry information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the identifying, filtering, mapping, and transmitting techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the identifying, filtering, mapping, and transmitting process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information. In some embodiments, communication interface 718 may allow computing system 700 to receive and transmit data entry information from one or more data stores.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 830 might transmit a requested code for an application program through Internet 728, ISP 726, local network 722 and communication interface 718. In some embodiments, computing system 700 may receive and transmit data entry or data set information from one or more databases across network link 720.

The received code may be executed by processor 704 as it is received, and/or stored in storage device 710, or other non-volatile storage for later execution. The received data entry or data set information may be stored in storage device 710 and manipulated, analyzed, or processed by processor 704 according to data propagation and mapping instructions stored in or received by computing system 700.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

EXAMPLE EMBODIMENTS

Further examples of embodiments of the present invention are defined, without limitation, by the following Example Enumerated Embodiments (EEEs):

EEE1. A computer-implemented method comprising:
by one or more processors executing program instructions:
accessing a user-defined ontology for a first type of data object, wherein the user-defined ontology comprises at least one or more properties associated with the first type of data object;
generating a first application programming interface associated with the first type of data object, based at least partly on the user-defined ontology;
determining a change to the user-defined ontology for the first type of data object; and
in response to determining the change, updating the first application programming interface based at least partly on the change to the user-defined ontology for the first type of data object.

EEE2. The computer-implemented method of EEE1 further comprising:
by the one or more processors executing program instructions:
receiving a first function associated with the first type of data object, wherein the first function is configured to execute an operation associated with the first type of data object;
storing the first function associated with the first type of data object in a registry of functions;
receiving a request to execute the first function associated with the first type of data object; and
executing the first function associated with the first type of data object.

EEE3. The computer-implemented method of any of EEE1-EEE2, wherein the first type of data object defines at least a set of properties associated with a first type data object instance.

EEE4. The computer-implemented method of EEE3, wherein a first type data object instance may utilize a variety of storage formats or storage locations.

EEE5. The computer-implemented method of any of EEE1-EEE4, wherein the first application programming interface is compatible with a plurality of programming languages.

EEE6. The computer-implemented method of any of EEE1-EEE5, further comprising automatically suggesting, using the first application programming interface, one or more properties associated with the first type of data object.

EEE7. The computer-implemented method of any of EEE1-EEE6, wherein the change to the user-defined ontology comprises adding, removing, renaming, or otherwise modifying a property from the at least one or more properties associated with the first type of data object.

EEE8. The computer-implemented method of any of EEE1-EEE7, wherein the first application programming interface is updated to provide access to an added property associated with the first type of data object.

EEE9. The computer-implemented method of any of EEE2-EEE8, wherein the first function includes one or more user-defined operations associated with the first application programming interface.

EEE10. The computer-implemented method of any of EEE2-EEE9, wherein the first function is updated based at least partly on a modification to the first function or the change to the user-defined ontology.

EEE11. The computer-implemented method of any of EEE2-EEE10, wherein the registry of functions comprises one or more functions that are stored in association with one or more types of data objects defined by the user-defined ontology.

EEE12. The computer-implemented method of any of EEE2-EEE11 further comprising:
by the one or more processors executing program instructions:
receiving a user input and automatically suggesting one or more functions associated with the first type of data object based at least partly on the user input.

EEE13. The computer-implemented method of any of EEE2-EEE12 further comprising:

by the one or more processors executing program instructions:
provide a list of one or more functions associated with the first type of data object.

EEE14. The computer-implemented method of any of EEE2-EEE13, wherein executing the first function associated with the first type of data object comprises displaying a result to a user through a user interface.

EEE15. The computer-implemented method of any of EEE2-EEE14, wherein executing the first function associated with the first type of data object is based at least partly on a user permission level.

EEE16. The computer-implemented method of any of EEE2-EEE15, wherein the user permission level is adjustable by a user.

EEE17. The computer-implemented method of any of EEE2-EEE16, wherein the one or more functions are defined based at least partly by the first application programming interface.

EEE18. A system comprising:
a computer readable storage medium having program instructions embodied therewith; and
one or more processors configured to execute the program instructions to cause the system to perform the computer-implemented method of any of EEE1-17.

EEE19. A computer program product comprising a computer readable storage medium having program instructions embodied therewith, the program instructions executable by one or more processors to cause the one or more processors to perform the computer-implemented method of any of EEE1-17.

While the above detailed description has shown, described, and pointed out novel features as applied to various embodiments, it may be understood that various omissions, substitutions, and changes in the form and details of the devices or processes illustrated may be made without departing from the scope of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
accessing an object definition for a first type of data object stored in a first storage format in a first data store, wherein the object definition comprises at least one or more properties associated with the first type of data object;
generating a first application programming interface associated with the first type of data object for accessing an instance of the first type of data object, based at least partly on the object definition;
receiving a first function associated with the first type of data object, wherein the first function is configured to execute an operation associated with the instance of the first type of data object by using the generated first application programming interface associated with the first type of data object;
storing the first function associated with the first type of data object in a registry of functions;
determining a change to the object definition for the first type of data object;
in response to determining the change, updating the first application programming interface based on the change to the object definition for the first type of data object;
receiving a request to execute the first function associated with the first type of data object; and
executing the first function associated with the first type of data object based on the updated first application programming interface.

2. The computer-implemented method of claim 1, wherein the change to the object definition comprises transforming at least a portion of the instance of the first type data object from the first storage format to a second storage format.

3. The computer-implemented method of claim 2, wherein the change to the object definition comprises transferring the transformed portion from a first data store to a second data store.

4. The computer-implemented method of claim 3, wherein the first application programming interface is compatible with a plurality of programming languages.

5. The computer-implemented method of claim 4, further comprising automatically suggesting, using the first application programming interface, one or more properties associated with the first type of data object.

6. The computer-implemented method of claim 5, wherein the first type of data object defines a set of properties associated with an instance of the first type of data object, and wherein the change to the object definition comprises adding, removing, renaming, or otherwise modifying a property from the at least one or more properties associated with the first type of data object.

7. The computer-implemented method of claim 6, wherein the first application programming interface is updated to provide access to an added property associated with the first type of data object.

8. The computer-implemented method of claim 7, wherein the first function includes one or more user-defined operations associated with the first application programming interface.

9. The computer-implemented method of claim 8, wherein the first function is updated based on a modification to the first function or the change to the object definition.

10. The computer-implemented method of claim 9, wherein the registry of functions comprises one or more functions that are stored in association with one or more types of data objects defined by the object definition.

11. The computer-implemented method of claim 10, further comprising:
receiving a user input and automatically suggesting one or more functions associated with the first type of data object based at least partly on the user input.

12. The computer-implemented method of claim 11, further comprising:
provide a list of one or more functions associated with the first type of data object.

13. The computer-implemented method of claim 12, wherein executing the first function associated with the first type of data object comprises displaying a result to a user through a user interface, and/or wherein executing the first function associated with the first type of data object is based on a user permission level.

14. A system comprising:
one or more processors configured to execute program instructions to cause the system to perform the computer-implemented method of claim 1.

15. A computer program product comprising a computer readable storage medium having program instructions embodied therewith, the program instructions executable by one or more processors to cause the one or more processors to perform the computer-implemented method of claim 1.

\* \* \* \* \*